US012609742B2

(12) United States Patent
Kolomvakis et al.

(10) Patent No.: US 12,609,742 B2
(45) Date of Patent: Apr. 21, 2026

(54) METHOD AND SYSTEM FOR DOWNLINK OUT-OF-BAND INTERFERENCE MITIGATION

(71) Applicant: Telefonaktiebolaget LM Ericsson (publ), Stockholm (SE)

(72) Inventors: Nikolaos Kolomvakis, Södertälje (SE); Majid Bavand, Ottawa (CA); Israfil Bahceci, Kanata (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 238 days.

(21) Appl. No.: 18/256,978

(22) PCT Filed: Dec. 30, 2021

(86) PCT No.: PCT/IB2021/062474
§ 371 (c)(1),
(2) Date: Jun. 12, 2023

(87) PCT Pub. No.: WO2022/144830
PCT Pub. Date: Jul. 7, 2022

(65) Prior Publication Data
US 2024/0106523 A1 Mar. 28, 2024

Related U.S. Application Data

(60) Provisional application No. 63/132,093, filed on Dec. 30, 2020.

(51) Int. Cl.
*H04B 7/06* (2006.01)
*H04B 7/185* (2006.01)

(52) U.S. Cl.
CPC ....... *H04B 7/0617* (2013.01); *H04B 7/18513* (2013.01)

(58) Field of Classification Search
CPC .......................... H04B 7/0617; H04B 7/18513
See application file for complete search history.

(56) References Cited

U.S. PATENT DOCUMENTS 9,071,299 B1 * 6/2015 Schelstraete ......... H04B 7/0452
9,838,100 B2 * 12/2017 Van Houtum ....... H04B 1/1036
(Continued)

FOREIGN PATENT DOCUMENTS

WO 2021/209792 A1 10/2021

OTHER PUBLICATIONS

International Search Report and Written Opinion dated Apr. 19, 2022 issued in PCT Application No. PCT/IB2021/062474 filed Dec. 30, 2021, consisting of 16 pages.
(Continued)

*Primary Examiner* — Raymond S Dean
(74) *Attorney, Agent, or Firm* — Weisberg I.P. Law, P.A.

(57) ABSTRACT

A method, system and apparatus are disclosed for downlink out-of-band interference mitigation. In one embodiment, a network node is configured to perform out-of-band (OOB) null steering and in-band null steering toward at least one direction; and use a constant amplitude precoder to align at least one radiation pattern associated with the OOB and in-band null steering. In one embodiment, a method implemented in a network node includes performing out-of-band, OOB, null steering and in-band null steering toward at least one direction; and using a constant amplitude precoder to align at least one radiation pattern associated with the OOB and in-band null steering.

18 Claims, 9 Drawing Sheets

(56) References Cited

U.S. PATENT DOCUMENTS

| | | | | |
|---|---|---|---|---|
| 2006/0126748 | A1* | 6/2006 | Lin ..................... | H04L 27/2624 |
| | | | | 375/260 |
| 2008/0159425 | A1* | 7/2008 | Khojastepour ...... | H04B 7/0452 |
| | | | | 375/260 |
| 2012/0281659 | A1* | 11/2012 | Zhang .................. | H04B 7/0452 |
| | | | | 370/329 |
| 2019/0120969 | A1* | 4/2019 | Hamzeh .................. | G01S 19/21 |
| 2019/0349042 | A1 | 11/2019 | Ramireddy et al. | |
| 2020/0169301 | A1* | 5/2020 | Hong .................... | H04L 5/0051 |
| 2020/0196173 | A1* | 6/2020 | Da Silva ............ | H04B 7/06952 |
| 2020/0241106 | A1* | 7/2020 | Shu ........................ | G01S 5/0252 |

OTHER PUBLICATIONS

Stallo et al., Intelligent Antennas for Mitigating GNSS Jamming & Spoofing Hazards on the ERTMS Train Control; Proceedings of the ION 2019; Pacific PNT Meeting, The Institute of Navigation, Apr. 11, 2019, consisting of 15 pages.

Kumar et al., Bringing Cross-Layer MIMO to Today's Wireless LANs; SIGCOM, ACM; Aug. 27, 2013, consisting of 12 pages.

Aghdam et al., Distortion-Aware Linear Precoding for Millimeter-Wave Multiuser MISO Downlink; In Proc. IEEE ICC 2019, consisting of 6 pages.

Larsson et al., Out-of-Band Radiation from Antenna Arrays Clarified; IEEE Wireless Communications Letters, Feb. 2018, consisting of 4 pages.

Mollen et al., Out-of-Band Radiation Measure for MIMO Arrays with Beamformed Transmission; In Proc. IEEE ICC 2016, consisting of 6 pages.

Communication pursuant to Article 94(3) EPC dated Dec. 2, 2025 for Application No. 21 841 034.8, consisting of 7 pages.

Zoltowski, M. et al., Beamspace Root-MUSIC, IEEE Transactions on Signal Processing, Vol. 41, No. 1, Jan. 1993, consisting of 21 pages.

* cited by examiner

METHOD AND SYSTEM FOR DOWNLINK OUT-OF-BAND INTERFERENCE MITIGATION

CROSS-REFERENCE TO RELATED APPLICATIONS

This application is a Submission Under 35 U.S.C. § 371 for U.S. National Stage Patent Application of International Application No.: PCT/IB2021/062474, filed Dec. 30, 2021 entitled "METHOD AND SYSTEM FOR DOWNLINK OUT-OF-BAND INTERFERENCE MITIGATION," which claims priority to U.S. Provisional Application No. 63/132,093, filed Dec. 30, 2020, entitled "METHOD AND SYSTEM FOR DOWNLINK OUT-OF-BAND INTERFERENCE MITIGATION," the entireties of both of which are incorporated herein by reference.

FIELD

The present disclosure relates to wireless communications, and in particular, to a method and system for downlink in-band and out-of-band interference mitigation.

BACKGROUND

The mid-band spectrum called "C-band" (3.7-4.2 GHz) is a main mid-band spectrum for $3^{rd}$ Generation Partnership Project (3GPP) $5^{th}$ Generation (5G, also called New Radio or NR) in the United States (U.S.) and it is currently used for satellite broadcasting. As shown in FIG. 1, part of C-band will be re-farmed for 5G usage and it will be done in 2 phases. In the first phase (H1 2021) 100 Mega Hertz (MHz) will be cleared for 5G, with an additional 20 MHz for guard-band. The rest remains for satellite use. In the second phase (2 years later), additional 180 MHz (total 280 MHz) will be re-farmed for 5G.

On this basis, there are stringent out-of-band (OOB) interference levels from the network node, e.g., base station (BS) towards the satellite ground stations (hereinafter "ground stations"), which are defined by the governmental regulatory agencies, such as the U.S. Federal Communications Commission (FCC). For example, the OOB emissions of 5G BSs towards the ground stations spectrum may not exceed −13 dBm/MHz at the BS transmitter side and −124 dBW/m2/MHz at the receiver level on the ground station.

If band filters are implemented for the long term (i.e., for the second phase cutting at 280 MHz), then, during the first phase between 3.82 GHz and 4 GHz (i.e., within the band filter) the 5G OOB interference towards the ground stations would be no less than −13 dBm, which yields considerably higher OOB interference levels than governmental regulatory agency requirements, e.g., FCC requirements, at the receiver ground station in most of the BS deployments. If operators implement the band filter for phase 1 (cutting at 100 MHz), the operators will have to swap the BS radios when they get additional spectrum in 2 years, thereby increasing the cost of deployment.

SUMMARY

Some embodiments advantageously provide a method and system for downlink out-of-band interference mitigation.

In one embodiment, a network node is configured to perform out-of-band (OOB) null steering and in-band null steering toward at least one direction; and use a constant amplitude precoder to align radiation patterns associated with the OOB and in-band null steering.

According to one aspect of the present disclosure, a method implemented in a network node is provided. The method includes performing out-of-band, OOB, null steering and in-band null steering toward at least one direction; and using a constant amplitude precoder to align at least one radiation pattern associated with the OOB and in-band null steering.

In one embodiment, the at least one direction includes a relative direction of at least one satellite ground station with respect to the network node. In one embodiment, the in-band comprises a C-band. In one embodiment, the method further includes determining the constant amplitude precoder to provide a constant amplitude power for the OOB and in-band nulls while also maintaining desired in-band nulls towards the at least one direction. In one embodiment, the constant amplitude precoder is based at least in part on at least one of: a minimization problem, P1; and a normalization matrix, $D_k$. In one embodiment, the determining the constant amplitude precoder comprises using a look-up table comprising a plurality of precoders, $P_k$, each precoder being associated with a corresponding normalization matrix, $D_k$.

In one embodiment, the determining the constant amplitude precoder according to $w=NDw_o$, where w represents the constant amplitude precoder, N represents a matrix that generates desired in-band null steering and D represents a power scaling matrix and $w_o$ represents a port-to-antenna mapping. In one embodiment, using the constant amplitude precoder to achieve equal average power levels among all antenna branches performing the OOB and in-band null steering. In one embodiment, the in-band is between 3.7-3.8 Gigahertz, GHz. In one embodiment, the OOB is between 3.82-4 Gigahertz, GHz.

According to another aspect, a network node comprising processing circuitry is provided. The processing circuitry is configured to cause the network node to perform out-of-band, OOB, null steering and in-band null steering toward at least one direction; and use a constant amplitude precoder to align at least one radiation pattern associated with the OOB and in-band null steering.

In one embodiment, the at least one direction includes a relative direction of at least one satellite ground station with respect to the network node. In one embodiment, the in-band comprises a C-band. In one embodiment, the processing circuitry is further configured to cause the network node to determine the constant amplitude precoder to provide a constant amplitude power for the OOB and desired in-band nulls while also maintaining the in-band nulls towards the at least one direction. In one embodiment, the constant amplitude precoder is based at least in part on at least one of: a minimization problem, P1; and a normalization matrix, $D_k$. In one embodiment, the processing circuitry is configured to cause the network node to determine the constant amplitude precoder by being configured to cause the network node to use a look-up table comprising a plurality of precoders, $P_k$, each precoder being associated with a corresponding normalization matrix, $D_k$.

In one embodiment, the processing circuitry is configured to cause the network node to determine the constant amplitude precoder according to $w=NDw_o$, where w represents the constant amplitude precoder, N represents a matrix that generates desired in-band null steering and D represents a power scaling matrix and $w_o$ represents a port-to-antenna mapping. In one embodiment, the processing circuitry is configured to cause the network node to use the constant amplitude precoder to achieve equal average power levels among all antenna branches performing the OOB and in-band null steering. In one embodiment, the in-band is between 3.7-3.8 Gigahertz, GHz. In one embodiment, the OOB is between 3.82-4 Gigahertz, GHz.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
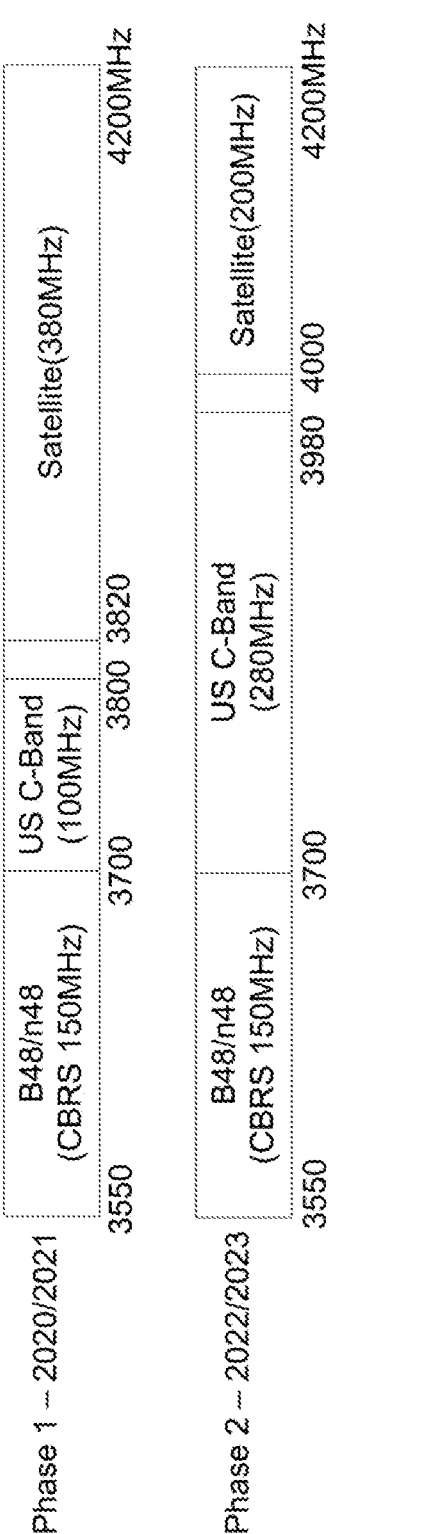
FIG. 1 illustrates an example of a part of C-band that will be re-farmed for 3G usage.

Some embodiments of the present disclosure provide a solution where the operators can use the network node radio in their allocated part of the C-band for the long term (i.e., phase 2) without interfering with the ground stations during the time frame of phase 1, and by a software upgrade (i.e., no site visit required) in the phase 2, will be able to switch to using the Active Antenna System (AAS) radios in the rest of the band i.e., once the ground stations users have vacated that part of the band.

Existing strategies for OOB interference mitigation towards the target areas are digital pre-distorters (DPD), cell power reduction and network node deployment. Cell power reduction will negatively impact cell coverage and throughput. The network node deployment limits the possible placement of network nodes. Finally, the solution of DPD may not be enough to reduce the OOB emissions to the desired level as defined by a governmental regulatory agency, such as the U.S. FCC.

Some embodiments of the present disclosure provide a new approach to reduce the OOB interference towards one or more directions. Operators can determine relative directions of the ground stations with respect to a network node (e.g., BS). The network node (NN) may use this input to not produce any OOB interference towards the given directions. However, current schemes that produce only OOB nulls are not feasible for products due to their high implementation complexity. On this basis, some embodiments may produce nulls in the in-band radiation pattern and scale the NN precoder in a such way to achieve equal power levels among the antenna branches of the NN antenna array (i.e., constant amplitude precoder), without destructing the null forming. By using a constant amplitude precoder, the in-band and OOB radiation patterns are strongly spatially correlated and thus they may be aligned. That is, the OOB null points towards the same direction as the in-band null, and the OOB interference towards given target areas may be reduced. Moreover, it may be possible to control the characteristics (such as width) of the generated null via configuration.

Some embodiments advantageously provide the operator with the opportunity to reduce the OOB interference towards certain horizontal and/or vertical directions with minimal impact on the cell and the WD 22 throughput. Furthermore, the solutions proposed herein may result in considerably lower computational and implementation complexity than existing solutions.

Before describing in detail example embodiments, it is noted that the embodiments reside primarily in combinations of apparatus components and processing steps related to a method and system for downlink out-of-band interference mitigation. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Even though the descriptions herein may be explained in the context of one of a Downlink (DL) and an Uplink (UL) communication, it should be understood that the basic principles disclosed may also be applicable to the other of the one of the DL and the UL communication. In some embodiments in this disclosure, the principles may be considered applicable to a transmitter and a receiver. For DL communication, the network node is the transmitter and the receiver is the WD. For the UL communication, the transmitter is the WD and the receiver is the network node.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices corresponding to a table, and/or one or more bit patterns representing the information.

Even though the descriptions herein may be explained in the context of one of a Downlink (DL) and an Uplink (UL) communication, it should be understood that the basic principles disclosed may also be applicable to the other of the one of the DL and the UL communication. In some embodiments in this disclosure, the principles may be considered applicable to a transmitter and a receiver. For DL communication, the network node is the transmitter and the receiver is the WD. For the UL communication, the transmitter is the WD and the receiver is the network node.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide a method and system for downlink out-of-band interference mitigation.

Figure 2:
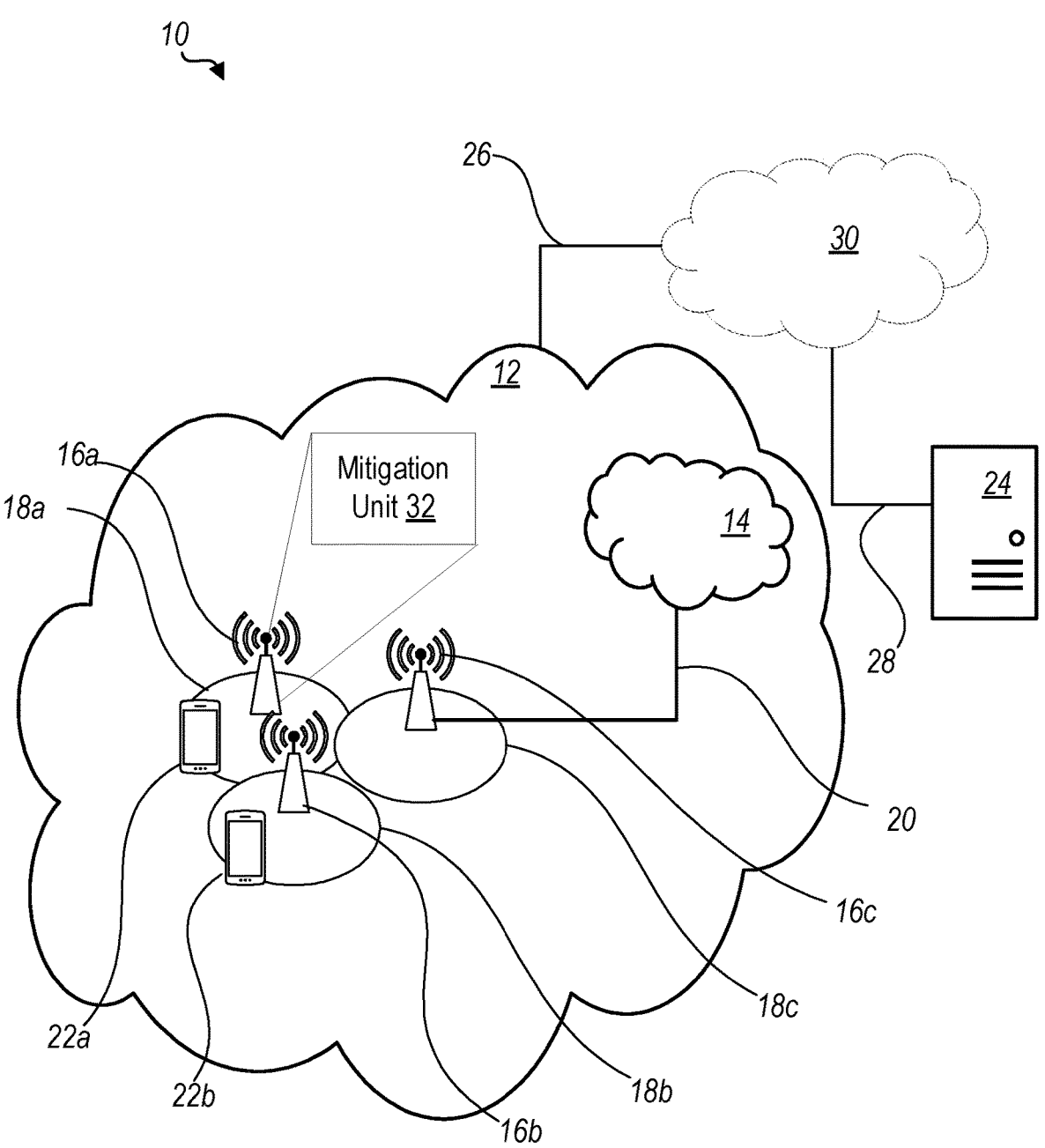
FIG. 2 is a schematic diagram of an example network architecture illustrating a communication system connected via an intermediate network to a host computer according to the principles in the present disclosure.

Referring again to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22*a*, 22*b* and the host computer 24. The connectivity may be described as an over-the-top (OTT) connection. The host computer 24 and the connected WDs 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A network node 16 is configured to include a mitigation unit 32 which is configured to cause the NN 16 to perform out-of-band (OOB) null steering and in-band null steering toward at least one direction; and use a constant amplitude precoder to align radiation patterns associated with the OOB and in-band null steering.

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include mitigation unit 32 configured to perform network node methods discussed herein, such as the methods discussed with reference to FIG. 8 as well as other figures.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22.

Figure 3:
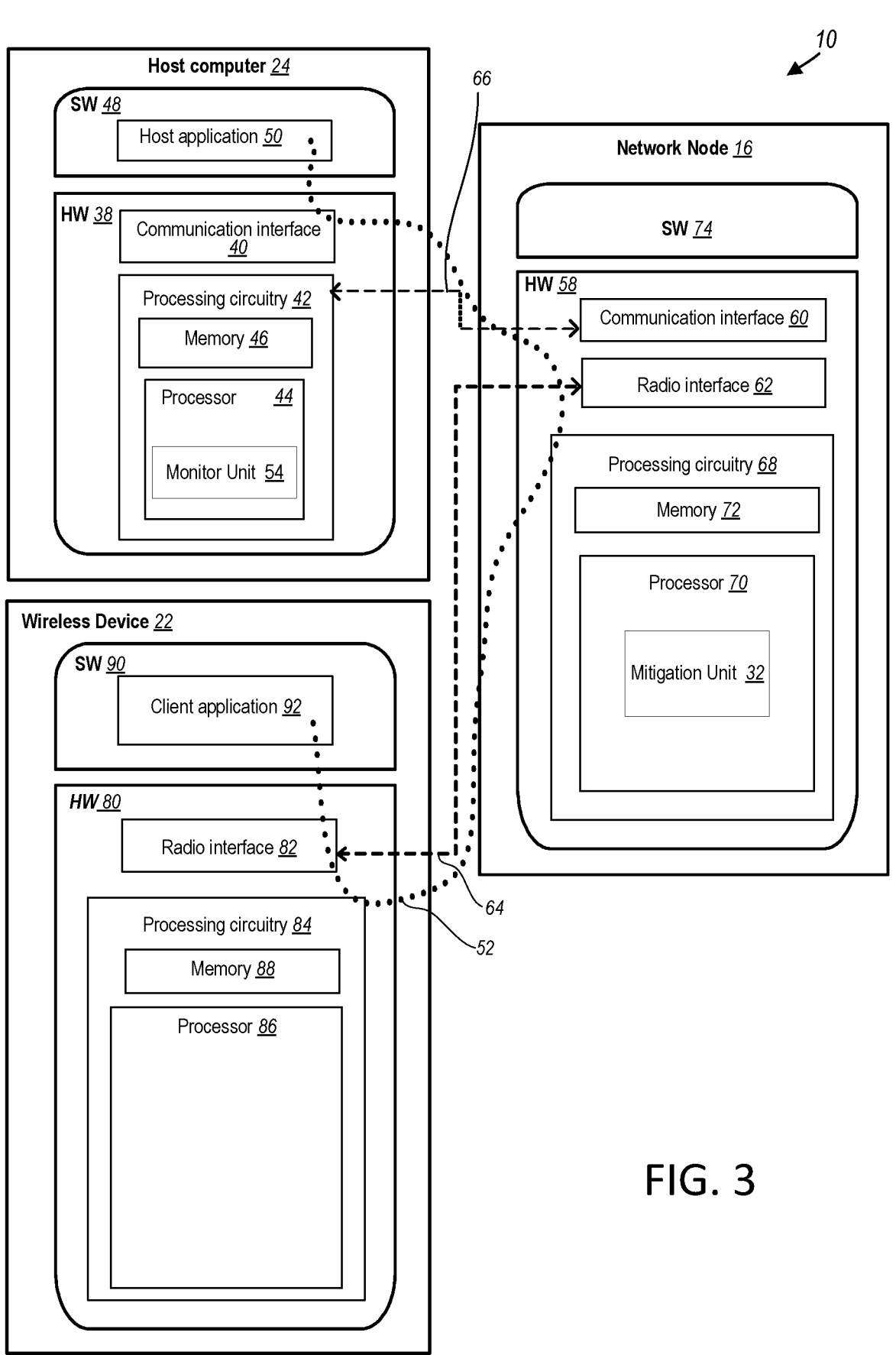
FIG. 3 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as mitigation unit 32, as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 4, 5:
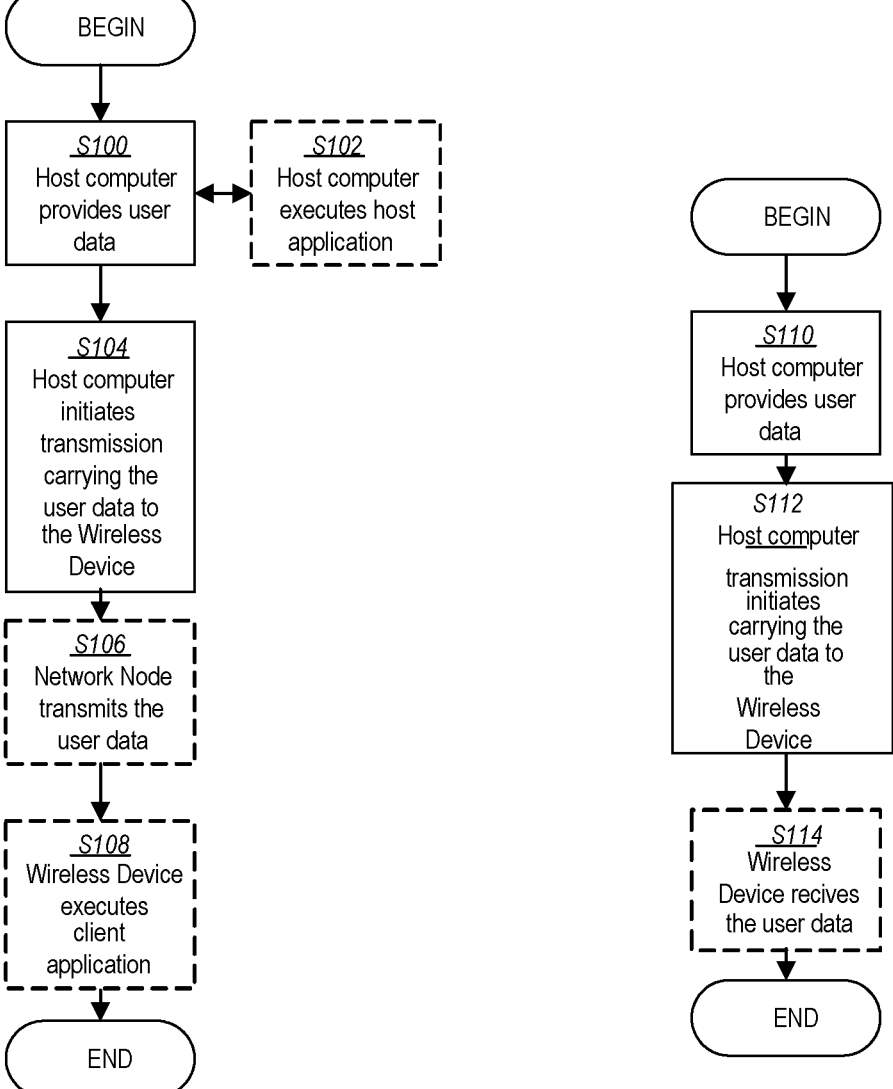
FIG. 4 is a flowchart illustrating example methods implemented in a communication system including a host computer, a network node and a wireless device for executing a client application at a wireless device according to some embodiments of the present disclosure.
FIG. 5 is a flowchart illustrating example methods implemented in a communication system including a host computer, a network node and a wireless device for receiving user data at a wireless device according to some embodiments of the present disclosure.

FIG. 4 is a flowchart illustrating an example method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 5 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 6, 7:
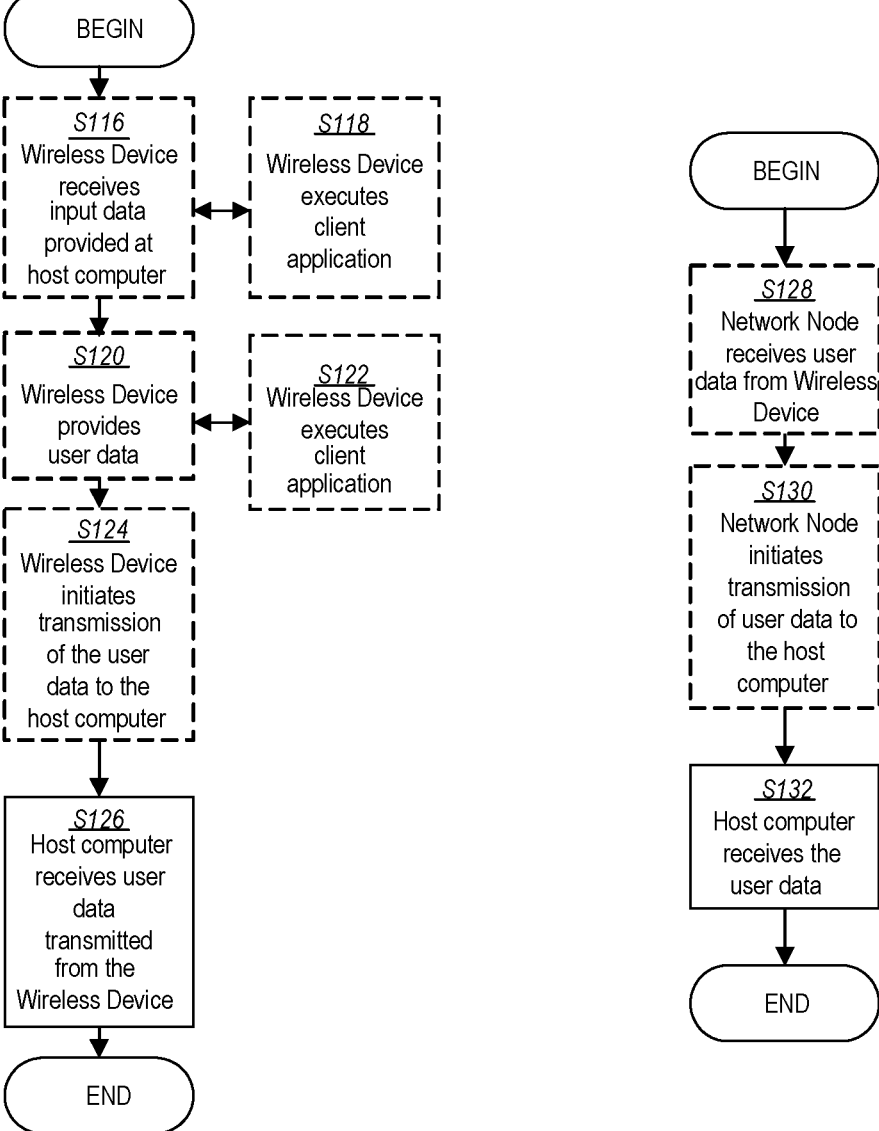
FIG. 6 is a flowchart illustrating example methods implemented in a communication system including a host computer, a network node and a wireless device for receiving user data from the wireless device at a host computer according to some embodiments of the present disclosure.
FIG. 7 is a flowchart illustrating example methods implemented in a communication system including a host computer, a network node and a wireless device for receiving user data at a host computer according to some embodiments of the present disclosure.

FIG. 6 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 7 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130).

In a third step, the host computer 24 receives the user data carried in the transmission initiated by the network node 16 (Block S132).

Figure 8:
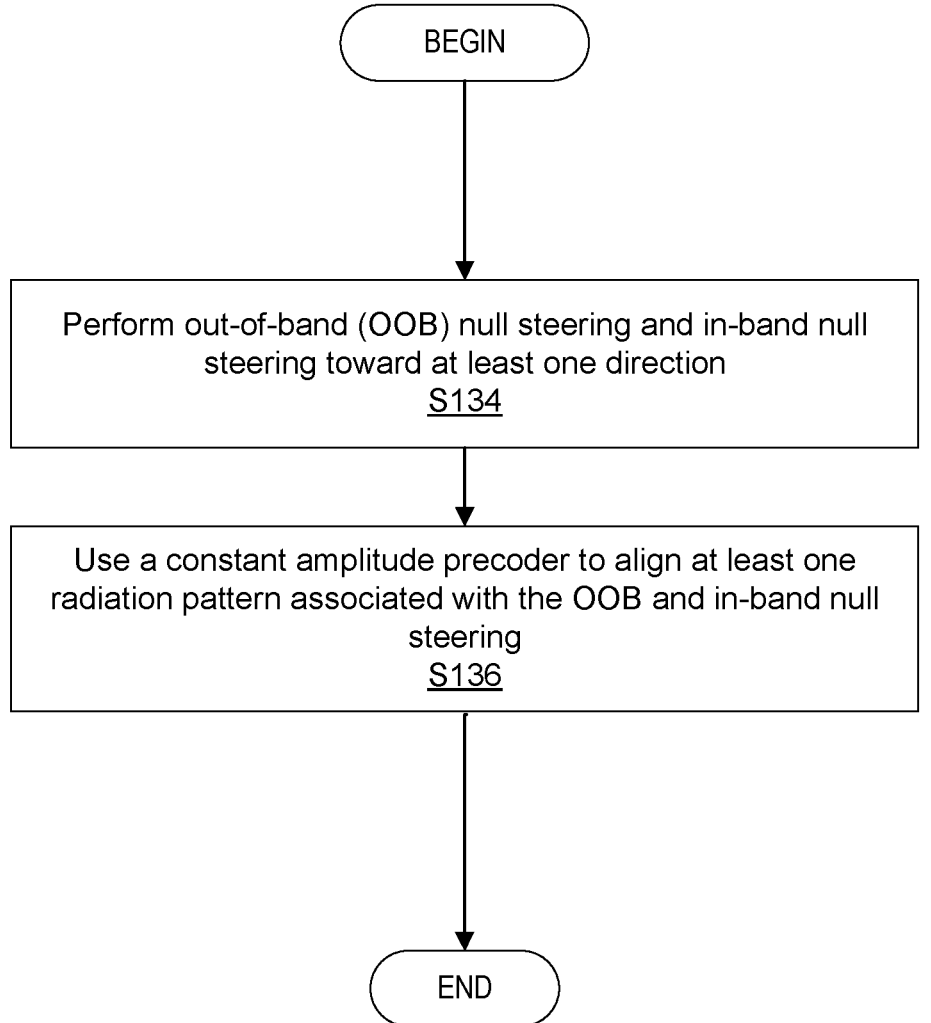
FIG. 8 is a flowchart of an example process in a network node according to some embodiments of the present disclosure.

FIG. 8 is a flowchart of an example process in a network node 16 according to some embodiments of the present disclosure. One or more Blocks and/or functions and/or methods performed by the network node 16 may be performed by one or more elements of network node 16 such as by mitigation unit 32 in processing circuitry 68, processor 70, radio interface 62, etc. according to the example method. The example method includes performing (Block S134), such as via mitigation unit 32, processing circuitry 68, processor 70, communication interface 60 and/or radio interface 62, out-of-band (OOB) null steering and in-band null steering toward at least one direction. The method includes using (Block S136), such as via mitigation unit 32, processing circuitry 68, processor 70, communication interface 60 and/or radio interface 62, a constant amplitude precoder to align at least one radiation pattern associated with the OOB and in-band null steering.

In some embodiments, the at least one direction includes a relative direction of at least one satellite ground station with respect to the network node. In some embodiments, the band comprises a C-band. In some embodiments, the performance of the OOB and in-band null steering in the at least one direction, such as via mitigation unit 32, processing circuitry 68, processor 70 and/or radio interface 62, is based on and/or dependent on a determination that the band is a C-band. In some embodiments, the constant amplitude precoder is based at least in part on a normalization matrix. In some embodiments, the method further includes determining the constant amplitude precoder to provide a constant amplitude power for the OOB and in-band nulls while also maintaining the in-band nulls towards the at least one direction.

In some embodiments, the network node 16 such as via mitigation unit 32, processing circuitry 68, processor 70, communication interface 60 and/or radio interface 62, is configured to determine the constant amplitude precoder to provide a constant amplitude power for the OOB and in-band nulls while also maintaining desired in-band nulls towards the at least one direction. In some embodiments, the constant amplitude precoder is based at least in part on at least one of: a minimization problem, P1; and a normalization matrix, $D_k$. In some embodiments, the network node 16 such as via mitigation unit 32, processing circuitry 68, processor 70, communication interface 60 and/or radio interface 62, is configured to cause the network node 16 to determine the constant amplitude precoder by being configured to cause the network node 16 to use a look-up table comprising a plurality of precoders, $P_k$, each precoder being associated with a corresponding normalization matrix, $D_k$.

In one embodiment, the network node 16 such as via mitigation unit 32, processing circuitry 68, processor 70, communication interface 60 and/or radio interface 62, is configured to determine the constant amplitude precoder according to w=ND$w_o$, where w represents the constant amplitude precoder, N represents a matrix that generates desired in-band null steering and D represents a power scaling matrix and $w_o$ represents a port-to-antenna mapping. In one embodiment, the network node 16 such as via mitigation unit 32, processing circuitry 68, processor 70, communication interface 60 and/or radio interface 62, is configured to use the constant amplitude precoder to achieve equal average power levels among all antenna branches performing the OOB and in-band null steering. In one embodiment, the in-band is between 3.7-3.8 Gigahertz, GHz. In one embodiment, the OOB is between 3.82-4 Gigahertz, GHz.

Having described the general process flow of arrangements of the disclosure and having provided examples of hardware and software arrangements for implementing the processes and functions of the disclosure, the sections below provide details and examples of arrangements for downlink out-of-band interference mitigation, which may be implemented by the network node 16, wireless device 22 and/or host computer 24.

Nonlinear hardware constraints cause a radio system (e.g., NN 16) to emit both in-band (i.e., within the same band or channel used for data) distortion and spurious power outside its allocated bandwidth. The latter case, i.e., OOB, the OOB radiation could harm the operation of a victim wireless system (e.g., satellite ground stations) which operates in adjacent frequency bands by interfering with its signal. Therefore, the amount of OOB radiation a transmitter (e.g., NN 16) is allowed to emit is regulated. Nevertheless, when the victim is a ground station, a governmental regulatory agency, e.g., FCC, may have additional requirements at the receiver of the ground station due to its higher than other systems sensitivity to interference.

In some embodiments, a proposed approach to meet the OOB interference requirements towards ground stations includes exploiting (e.g., by the NN 16) the implemented desired null-steering solution together with a power normalization without destructing the desired null forming achieving a constant amplitude precoder (i.e., equal average power levels among the NN 16 antenna branches). On this basis, the highest spatial correlation between the desired beamforming and in-band as well as OOB beam radiation patterns may be achieved and thus, the desired null-steering may be also identical for in-band and OOB frequencies. It is noted that, in the ideal scenario where there are not hardware non-linearities, the desired null-forming is not distorted, and thus it is retained in its in-band frequencies.

Figure 9:
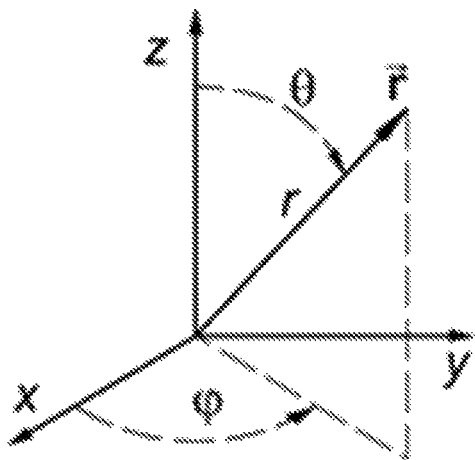
FIG. 9 illustrates an example 3-axis coordinate system where an antenna array is located on the x-axis according to some embodiments of the present disclosure.

In some embodiments, it may be assumed that a one-dimensional antenna array with N transmit antenna elements exists and the array is located on the x-axis as shown in FIG. 9. On this basis, the steering vector between the NN 16 and the k-th ground station at $\theta_k$, $\phi_k$ can be presented as, for example:

$$v_k = \left[ e^{j\frac{2\pi}{\lambda} sin\theta_0 cos\phi_0 x_0}, \ \dots \ , e^{j\frac{2\pi}{\lambda} sin\theta_0 cos\phi_0 x_{N-1}} \right],$$

and let V=[$v_1$, ..., $v_K$]$^T$ be a K×N matrix, where K is the number of ground station (or nulls). Then, the constant amplitude zero-forcing precoder is the solution for finding w in the following minimization problem:

$$\min \| w - w_o \|^2 \tag{P1}$$
$$\text{subject to } Vw = 0,$$
$$\text{diag}(ww^H) = 1_{N \times 1},$$

where diag(·) denotes the diagonal elements of the matrix $ww^H$. That is, the beam may be optimized by making the beamforming weights w to be as close as possible to the original beamforming weight or port-to-antenna mapping $w_o$.

Suboptimal Solution

Next, in some embodiments, a suboptimal solution to the problem (P1) is provided that satisfies its two fundamental constraints; that is, the desired in-band null-steering towards ground stations and constant amplitude precoder (i.e., first and second constraints, respectively). Notice that this approach is proposed to be implemented in the product for horizontal nulling (e.g., by the NN 16). However, it may also be implemented for vertical nulling (e.g., by the NN 16), as well.

In some embodiments, the N×N matrix N may be defined as the projection matrix that generates K nulls towards the ground stations which has been implemented as the in-band null-steering solution. Additionally, let the diagonal matrix D be the power scaling that achieves a constant amplitude precoder. Then, in some embodiments, a suboptimal solution that satisfies the constraints in the minimization problem (P1) may include the following effective precoder w at the NN 16:

$$w = NDw_o \qquad (5.1)$$

where $w = [w_1, \ldots , w_N]^T$ and $$N = \left(I - V^H \left(VV^H\right)^{-1} V\right).$$

The matrix D may be chosen (e.g., by the NN 16) such that w will be a constant amplitude precoder, that is $$|w_n|^2 = 1, n = 1, \ldots , N. \qquad (5.2)$$

Next, in some embodiments, a convenient form for calculating (e.g., by the NN 16) the matrix D may be derived. On this basis, the diagonal matrix $W_o$ may be defined where its diagonal elements are the elements of the vector $w_o$, that is, for example:

$$W_o = \begin{pmatrix} w_{o1} & \ldots & 0 \\ \vdots & \ddots & \vdots \\ 0 & \ldots & w_{oN} \end{pmatrix}.$$

The vector $d=[d_1 \ldots d_N]$ T includes the diagonal elements of D. Then, it may be easier to verify that $Dw_o = W_o d$ and thus, the effective precoder w can be rewritten as $w=NW_o d=Ad$, where $A=NW_o$. Now, the n-th equation of (5.2) may be written as, for example:

$$\sum_i \sum_j A_{ni} A_{nj}^* d_i d_j = 1 \Rightarrow d^T B^{(n)} d = 1, n = 1, \ldots N. \qquad (5.3)$$

where $$B_{ij}^{(n)} = A_{ni} A_{nj}^*.$$

Thus, the matrix D may be determined (e.g., by the NN 16) by solving N equation with N unknown variables. Notice that practically N is the number of ports which is lower than the number of antennas. Currently, advanced antenna products support up to 32 ports including both polarizations, i.e., N≤32. However, the proposed solution may be common for both polarizations and thus, it may be sufficient to solve for only one polarization and thereby reduce the computation complexity. In this case, the system of equations in (5.3) may be reduced to up to 16 equations with 16 unknown variables.

In some embodiments, the method may be extended to higher-rank transmissions. Let $X_0=[w_0 \ldots w_1 \ldots W_{L-1}]$ denote the N×L matrix for L-layer transmission with each column representing the precoding weights for a single layer. Then, L normalization matrix $D_l$, $l=0, \ldots , L-1$, may be determined (e.g., by the NN 16) by solving (P1) for each column of $X_0$. The effective precoder with the desired nulling weights may then be determined by:

$$X_0 = \begin{bmatrix} D_0 w_0 & \ldots & D_l w_l, & \ldots & D_{L-1} w_{L-1} \end{bmatrix}.$$

Codebook-Based Look-Up Table

In codebook-based transmission, WDs 22 may recommend a precoding matrix to the NN 16 according to the channel state information (CSI) at the WD 22 side. The set of all precoding matrices form the codebook of the NN 16. More specifically, let $p_k$ be the N×r precoding matrix with rank r, chosen from a codebook $\mathcal{C}^{(r)}=\{p_k|1\leq k\leq K\}$ including K precoders. Moreover, given the fact that the ground stations are in fixed positions, in some embodiments, the projection matrix N may be assumed to be constant for a specific NN 16 and thus, the matrix D is calculated (e.g., by the NN 16) only for the K different precoding matrices that belong to $\mathcal{C}$.

On this basis, given the matrix N, the matrix D may be calculated (e.g., by the NN 16) based on (5.3) offline by substituting $w_o=p_k$ for all k and may be stored in a lookup table $\mathcal{T} =\{D_k|1\leq k\leq K\}$. Then, in some embodiments, a specific precoder $p_k$ corresponds to a unique normalization matrix $D_k$ and the effective precoder at the NN 16 for the precoder matrix index (PMI) k becomes, for example:

$$w_k = ND_k p_k,$$

where $D_k=\mathcal{T}$ (k) and $p_k=\mathcal{C}$ (k). The size of the lookup table may be equal to the size of the codebook. For example, for rank 1 transmission, the size of the lookup table is K=256, i.e., it includes 256 diagonal matrices, while it can be up to K=1024 for rank 2 transmission.

Alternatively, in some embodiments, column-specific normalization matrices may be determined (e.g., by the NN 16) for each column of each of the precoder in the codebook (as described above). This approach may reduce the complexity of the solution since it relaxes the constraints for the normalization weights.

In some cases, the columns of precoders $p_k$, denoted by $$p_k^{(c)}, c = 0, \ldots , r-1,$$

can be selected (e.g., by the NN 16) from a common set, e.g., $$p_k^{(c)}$$

$\in \wp$ where $\wp$ contains a set of vectors representing the beamformers for a single layer transmission. Such codebook may require only $|\wp|$ normalization matrices. Thus, the computation and storage complexity for normalization matrices reduces significantly. For example, for 3GPP, codebook mode-1 requires only $O_1N_1$ and $O_2N_2$ normalization matrices for dimension-1 and dimension-2 precoders, respectively, to create a null in the respective dimension. Thus, instead of $O_1N_1O_2N_2$ normalization matrices for the whole codebook, one only needs $O_1N_1+O_2N_2$ normalization matrices in the look-up table. And if nulling in only one dimension is needed, then only $O_1N_1$ or $O_2N_2$ entries in the look-up table may be required. In 3GPP, recall that the codebook is indicated by a precoder matric index (PMI) indicating the indices of dimension-1 and dimension-2 precoders. In codebook mode-1, multi-layer transmission, odd layer precoder indices are indicated relative to even layers, e.g., if $(i_{11}, i_{12})$ indicating layer-0 transmission for dimension-1 and dimension-2, $(i_{11}+k_1, i_{12}+k_2)$. Thus, based on the index of the precoder's column, the normalization weight may be chosen (e.g., by the NN 16) corresponding to $i_{11}$ or $i_{11}+k_1$ for dimension-1 and $i_{12}$ or $i_{12}+k_2$ for dimension-2.

Numerical Results

In this section, the proposed method for OOB null-steering may be evaluated and compared with the case of a precoder without the normalization matrix D. A memoryless, third order polynomial model may be assumed for the power amplifier's non-linearities, without the employment of DPD.

Figure 10:
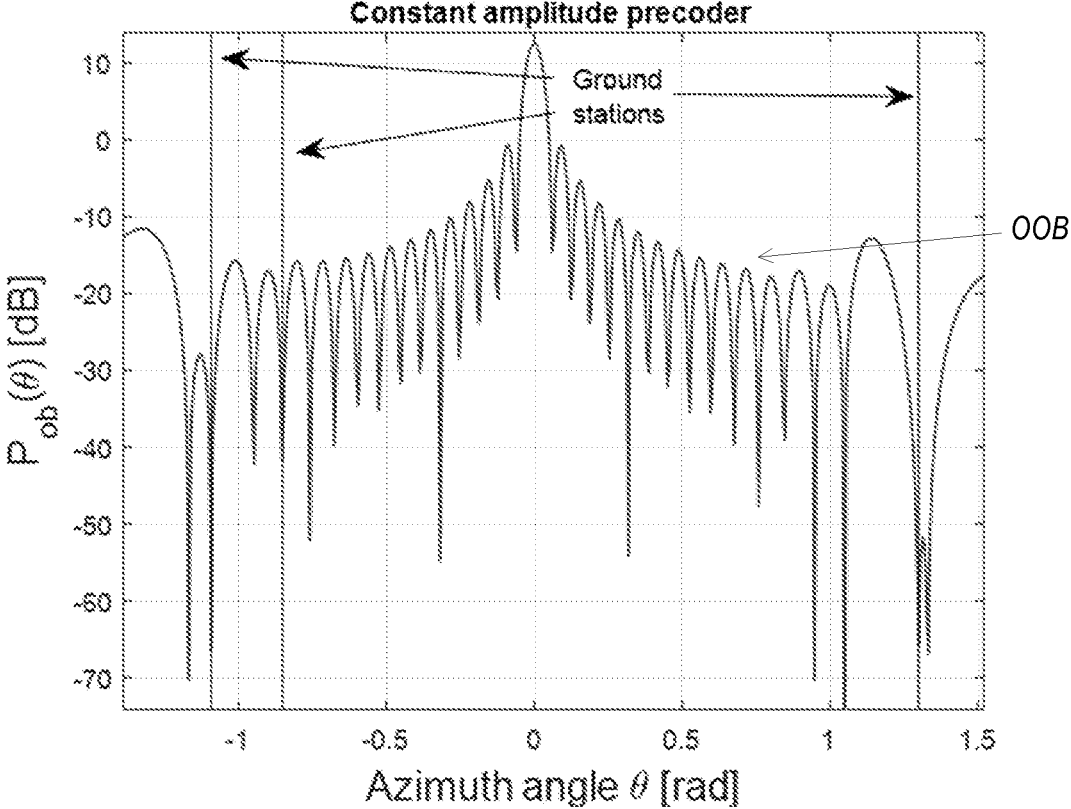
FIG. 10 illustrates an example of the power of OOB emissions as a function of the azimuth angle employing an antenna array with N=32 elements and rank-1 transmission according to some embodiments of the present disclosure.

FIG. 10 illustrates an example of the adjacent-band power with the normalization matrix D, i.e., $w_k=NDp_k$, in different azimuth directions in a line-of-sight channel with 32 antennas and 3 ground stations. The vertical lines indicate the directions of the users. In FIG. 10, the power of OOB emissions is illustrated as a function of the azimuth angle employing an antenna array with N=32 elements and rank-1 transmission. The precoder w is normalized such that to achieve both constant amplitude power and maintenance of the desired in-band null towards the ground station as shown in (equation 5.1 above), i.e., $w_k=NDp_k$. As can be seen, the in-band nulls towards the ground stations are aligned with the OOB null.

Figure 11:
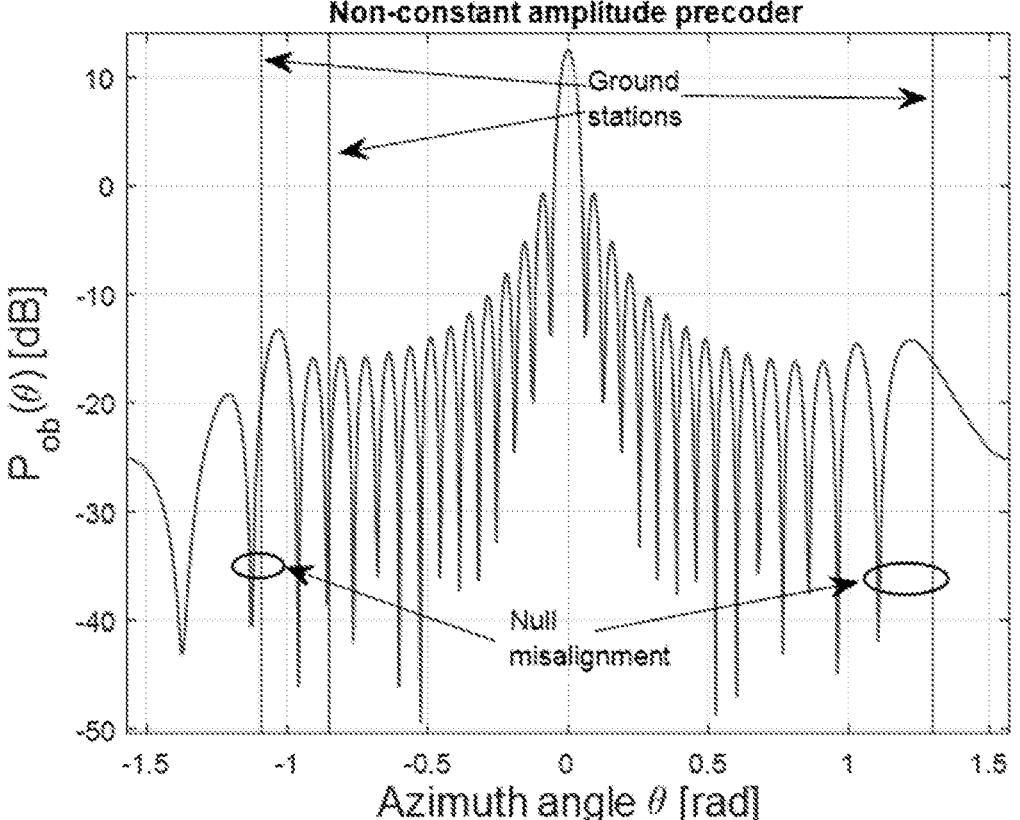
FIG. 11 illustrates an example of the precoder w without the normalization matrix D, $w_k=Np_k$, which is not able to align the OOB nulls with the desired nulls generated by the projection matrix N according to some embodiments of the present disclosure.

FIG. 11 illustrates an example of the adjacent-band power without the normalization matrix D, i.e., $w_k=Np_k$, in different azimuth directions in a line-of-sight channel with 32 antennas and 3 ground stations. The vertical lines indicate the directions of the users. However, in FIG. 11, the precoder w without the normalization matrix projection matrix N is shown. Notice, that the nulls are misaligned with the position of the ground stations due to the lack of a constant amplitude precoder, thereby allowing a relatively high variance of output power among the power amplifiers. The latter makes the in-band and OOB radiation patterns less correlated.

Some embodiments may include one or more of the following:

Embodiment A1

A network node configured to communicate with a wireless device (WD), the network node configured to, and/or comprising a radio interface and/or comprising processing circuitry configured to:

perform out-of-band (OOB) null steering and in-band null steering toward at least one direction; and use a constant amplitude precoder to align radiation patterns associated with the OOB and in-band null steering.

Embodiment A2

The network node of Embodiment A1, wherein at least one of:

the at least one direction includes a relative direction of at least one satellite ground station with respect to the network node;

the band comprises a C-band; and the constant amplitude precoder is based at least in part on a normalization matrix.

Embodiment A3

The network node of Embodiment A1, wherein the network node and/or the radio interface and/or the processing circuitry is further configured to:

determine the constant amplitude precoder to provide a constant amplitude power for the OOB and in-band nulls while also maintaining the in-band nulls towards the at least one direction.

Embodiment B1

A method implemented in a network node, the method comprising:

performing out-of-band (OOB) null steering and in-band null steering toward at least one direction; and using a constant amplitude precoder to align radiation patterns associated with the OOB and in-band null steering.

Embodiment B2

The method of Embodiment B1, wherein at least one of:

the at least one direction includes a relative direction of at least one satellite ground station with respect to the network node;

the band comprises a C-band; and the constant amplitude precoder is based at least in part on a normalization matrix.

Embodiment B3

The method of Embodiment B1, further comprising:

determining the constant amplitude precoder to provide a constant amplitude power for the OOB and in-band nulls while also maintaining the in-band nulls towards the at least one direction.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

ABBREVIATION EXPLANATION

AAS Advanced Antenna Systems
FCC U.S. Federal Communications Commission (governmental regulatory agency)
OOB Out of Band
PMI Precoding Matrix Indication It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a network node, the method comprising:
   performing out-of-band, OOB, null steering and in-band null steering toward at least one direction;
   using a constant amplitude precoder to align at least one radiation pattern associated with the OOB and in-band null steering; and
   determining the constant amplitude precoder according to w=NDw_o, where w represents the constant amplitude precoder, N represents a matrix that generates desired null steering and D represents a power scaling matrix and w_o represents a port-to-antenna mapping.

2. The method of claim 1, wherein the at least one direction includes a relative direction of at least one satellite ground station with respect to the network node.

3. The method of claim 1, wherein the in-band comprises a C-band.

4. The method of claim 1, further comprising:
   determining the constant amplitude precoder to provide a constant amplitude power for the OOB and in-band nulls while also maintaining desired in-band nulls towards the at least one direction.

5. The method of claim 1, wherein the constant amplitude precoder is based at least in part on at least one of:
   a minimization problem, P1; and
   a normalization matrix, $D_k$.

6. The method of claim 4, wherein the determining the constant amplitude precoder comprises:
   using a look-up table comprising a plurality of precoders, $P_k$, each precoder being associated with a corresponding normalization matrix, $D_k$.

7. The method of claim 1, wherein using the constant amplitude precoder to achieve equal average power levels among all antenna branches performing the OOB and in-band null steering.

8. The method of claim 1, wherein the in-band is between 3.7-3.8 Gigahertz, GHz.

9. The method of claim 1, wherein the OOB is between 3.82-4 Gigahertz, GHz.

10. A network node comprising processing circuitry, the processing circuitry configured to cause the network node to:

perform out-of-band, OOB, null steering and in-band null steering toward at least one direction;

use a constant amplitude precoder to align at least one radiation pattern associated with the OOB and in-band null steering; and cause the network node to determine the constant amplitude precoder according to $w = NDw\_o$, where $w$ represents the constant amplitude precoder, $N$ represents a matrix that generates desired null steering and $D$ represents a power scaling matrix and $w\_o$ represents a port-to-antenna mapping.

11. The network node of claim 10, wherein the at least one direction includes a relative direction of at least one satellite ground station with respect to the network node.

12. The network node of claim 10, wherein the in-band comprises a C-band.

13. The network node of claim 10, wherein the processing circuitry is further configured to cause the network node to:

determine the constant amplitude precoder to provide a constant amplitude power for the OOB and in-band nulls while also maintaining desired in-band nulls towards the at least one direction.

14. The network node of claim 10, wherein the constant amplitude precoder is based at least in part on at least one of:

a minimization problem, P1; and a normalization matrix, $D_k$.

15. The network node of claim 13, wherein the processing circuitry is configured to cause the network node to determine the constant amplitude precoder by being configured to cause the network node to:

use a look-up table comprising a plurality of precoders, $P_k$, each precoder being associated with a corresponding normalization matrix, $D_k$.

16. The network node of claim 10, wherein the processing circuitry is configured to cause the network node to use the constant amplitude precoder to achieve equal average power levels among all antenna branches performing the OOB and in-band null steering.

17. The network node of claim 10, wherein the in-band is between 3.7-3.8 Gigahertz, GHz.

18. The network node of claim 10, wherein the OOB is between 3.82-4 Gigahertz, GHz.

\* \* \* \* \*